United States Patent [19]

Hazelton et al.

[11] Patent Number: 4,851,468

[45] Date of Patent: * Jul. 25, 1989

[54] DYNAMICALLY CURED THERMOPLASTIC OLEFIN POLYMERS

[75] Inventors: Donald Hazelton, Chatham; Robert C. Puydak, Cranbury, both of N.J.

[73] Assignee: Exxon Research & Engineering Company, Florham Park, N.J.

[ * ] Notice: The portion of the term of this patent subsequent to Jun. 3, 2003 has been disclaimed.

[21] Appl. No.: 159,199

[22] Filed: Feb. 23, 1988

Related U.S. Application Data

[63] Continuation of Ser. No. 868,422, May 28, 1986, abandoned, which is a continuation-in-part of Ser. No. 679,827, Dec. 10, 1984, Pat. No. 4,593,062.

[51] Int. Cl.[4] .................. C08L 23/26; C08L 9/00; C08L 11/00
[52] U.S. Cl. ................... 524/519; 525/194; 525/215; 525/221; 525/222; 525/227
[58] Field of Search ............... 525/240, 192–194, 525/232, 237, 215; 524/519

[56] References Cited

U.S. PATENT DOCUMENTS

| | | | |
|---|---|---|---|
| 3,037,954 | 6/1962 | Gessler et al. | 525/141 |
| 3,592,881 | 7/1971 | Ostapchenko | 525/232 |
| 3,904,470 | 9/1975 | Fukuki et al. | 525/240 |
| 4,087,485 | 5/1978 | Huff | 525/240 |
| 4,104,210 | 8/1978 | Coran et al. | 525/232 |
| 4,130,534 | 12/1978 | Coran et al. | 525/232 |
| 4,202,801 | 5/1980 | Peterson | 525/232 |
| 4,212,787 | 7/1980 | Matsuda et al. | 525/232 |
| 4,348,266 | 9/1982 | Coran et al. | 204/159.2 |
| 4,350,795 | 9/1982 | Bohm et al. | 525/194 |
| 4,593,062 | 6/1986 | Puydak et al. | 524/426 |

FOREIGN PATENT DOCUMENTS 8145741 8/1983 Japan ................... 525/240

*Primary Examiner*—Carman J. Seccuro
*Attorney, Agent, or Firm*—H. L. Cohen

[57] ABSTRACT

Soft, resilient thermoplastic compositions with good physical strength useful as molded parts including hoses, seals and gaskets which exhibit good flow and good surface characteristics in injection molded parts. The compositions comprise ethylene copolymer resin (e.g., ethylene vinyl acetate), halogenated butyl rubber and polychloroprene wherein the rubbers have been dynamically vulcanized to a fully cured state in the presence of the ethylene copolymer resin.

22 Claims, No Drawings

DYNAMICALLY CURED THERMOPLASTIC OLEFIN POLYMERS

This is a continuation of application Ser. No. 868,422, filed May 28, 1986, now abandoned, which is a continuation-in-part of U.S. patent application Ser. no. 679,827, filed Dec. 10, 1984, now U.S. Pat. No. 4,593,062.

BACKGROUND OF THE INVENTION

In recent years there has been significant commercial interest in polymer blends which have a combination of both elastic and thermoplastic properties. These polymer blends have been given the generic designation of Thermoplastic Olefins ("TPO"). They exhibit some of the properties of a cured elastomer as well as the re-processibility of thermoplastic resins. The elastomeric characteristics are enhanced if one component of the blend is a vulcanizable elastomer which is wholly or partially crosslinked.

The earliest work in the curing of TPO compositions area was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler, U.S. Pat. No. 3,037,954 discloses compositions comprising polypropylene and a rubber wherein the rubber can be, inter alia, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. Nos. 3,758,643 and 3,806,558 disclose TPO type polymers comprising an olefin resin and olefin copolymer rubber wherein the rubber is dynamically cured to a partial cure state. These compositions are reprocessible and result in molded products having good surface appearance. However, the potential applications of these products is limited because of high compression set and/or low softening temperatures resulting from only a partial cure of the rubber. Furthermore, the partial peroxide cure utilized is difficult to control from the standpoint of completeness of reaction, resulting in batch to batch variations in product properties.

U.S. Pat. No. 4,130,534 discloses TPO blends which comprise a polyolefin resin and a butyl rubber wherein the blend comprises up to 60 wt% of polyolefin resin and 40 wt% or more of a rubber. The butyl rubbers which can be utilized include butyl rubber per se as well as chlorinated or brominated butyl rubber. In the preferred embodiment, the polyolefin resin comprises 20 to 45 wt% of the blend and the rubber comprises about 80 to 55 wt% of the blend. The rubber is said to be fully cured, the cure being a dynamic vulcanization.

U.S. Pat. No. 4,130,535 discloses TPO compositions wherein the rubber component is an ethylene propylene copolymer ("EPM") or terpolymer ("EPDM"). The preferred thermoplastic polyolefin resins are polypropylene and polyethylene. The compositions comprise about 75 to about 25 wt% polyolefin resin and about 25 to about 75 wt% rubber. The rubber is dynamically cured to a fully cured state. Similar compositions are disclosed in U.S. Pat. No. 4,311,628 wherein the cure system for the rubber is a metal activated halo resin cure, e.g., brominated dimethylol phenol resins.

These TPO systems wherein the rubber is fully cured have the disadvantage that, as a result of poor flow characteristics, injection molded components made from these TPO's exhibit "flow line" imperfections. As a consequence special mold designs are required to minimize the problem, especially for large parts. Applications are further limited because of the high Shore A hardness of the composition.

U.S. Pat. No. 4,409,365 discloses TPO compositions in which a polyolefin resin is combined with an EPDM and a nitrile rubber. The rubbers are vulcanized and the product is said to have improved oil resistance.

U.S. Pat. No. 3,081,279 discloses compositions wherein a rubber such as butyl rubber is combined with a sulfochlorinated polyolefin resin and cured. The uncured blend is said to have improved processing characteristics.

U.S. Pat. No. 2,369,471 discloses blends of ethylene polymers with various hydrocarbon rubbers and halogenated rubbers. The compositions are either uncured or compression molded vulcanizates.

U.S. Pat. No. 4,302,557 discloses a shrink film which comprises an EPM or EPDM rubber and a low density polyethylene or soft ethylene copolymer such as ethylene vinylacetate. Alternatively, the polymer blends can include polypropylene or high density polyethylene (HDPE). Another variant of the disclosed composition comprises the ethylene copolymer rubber with the polypropylene or HDPE. The rubber can be unvulcanized or, in the alternative a film of the blend is prepared and radiation cross-linked to form a heat shrinkable film.

U.S. Pat. No. 4,212,787 discloses a combination of a peroxide curable rubber and a peroxide decomposible polyolefin resin which may, alternatively have incorporated therein a non-peroxide curable rubber such as polyisobutylene. The peroxide curable rubber is preferably an ethylene propylene rubber (EPR) and the peroxide decomposible polymer is preferably polypropylene. The curable rubber is partially cured in the manner of U.S. Pat. No. 3,866,558, supra. The partial curing can be carried out in the presence of divinyl benzene. The product is said to have improved flexibility and rebound elasticity. The compositions comprise about 100 to 5 parts by weight of a partially cured elastomer which is prepared by the dynamic heat treatment in the presence of a peroxide of a mixture of 100 to 40 parts by weight of (a) peroxide-curable olefin copolymer rubber and 0 to 60 parts by weight of (b) a peroxide-decomposible olefin plastic; and 5 to 100 parts of at least one (c) peroxide non-curable hydrocarbon rubber.

U.S. Pat. No. 4,202,801 discloses dynamically partially cured blends of EPM or EPDM with a resin (polyethylene or polypropylene) and a conjugated diene rubber, e.g., polychloroprene. The composition is a typical TPO. While polychloroprene is disclosed as one of the conjugated diene rubbers, it is one of many rubbers disclosed, and no preference is taught nor do any examples illustrate the use of polychloroprene or any benefit derived therefrom.

U.S. Pat. No. 4,348,266 discloses, inter alia, an elastoplastic composition which can comprise 20–45 parts of polyethylene and 80 to 55 parts of polychloroprene. The preferred embodiment is cured by irradiation. A comparison is made with a control which is chemically cured by dynamically vulcanizing a PE/polychloroprene blend wherein the curative system is ZnO, benzothiazyldisulfide and m-phenylene bismaleimide.

Other TPO compositions have been prepared utilizing a thermoplastic polyolefin resin in conjunction with a rubber. U.S. Pat. No. 4,104,210 discloses compositions wherein the rubber is a diolefin rubber, e.g., natural rubber, polyisoprene, nitrile rubber or styrene butadiene rubber. The rubber is fully cured. U.S. Pat. No. 4,211,049 discloses particular curatives for the TPO compositions containing diolefin rubbers, e.g., phenolic curatives, urethane curatives and certain sulfur donor curatives. U.S. Pat. No. 4,141,878 discloses TPO compositions wherein the rubber is cross-linked chlorosulfonated polyethylene.

The TPO compositions of the prior art are either compositions in which the rubber component is uncured or partially cured and have low tensile strength and high compression set or are compositions containing a fully cured rubber portion and consequently are high in hardness and have poor flow characteristics when injection molded, resulting in flow lines in the finished product.

Various other compositions of resins with rubbers are taught in the art. The resins are generally polyethylene or polypropylene.

U.S. Pat. No. 3,407,253 discloses a blend of a crystalline polyolefin, e.g., polypropylene with a rubber, e.g., butyl rubber which is alleged to have voids when the polyolefin is stretched. The elastomer is unvulcanized. The product is non-transparent and has a leather like feel.

U.S. Pat. No. 3,597,372 discloses a blend of a thermoplastic and a rubber, e.g., polypropylene with neoprene. The rubber is cross-linked by chemical means or with irradiation. The composition, when formed into articles and cured, exhibits shrink properties.

U.S. Pat. No. 3,701,702 discloses compositions of about 2 to about 30 wt% of a fiber forming thermoplastic resin, e.g., polypropylene and an elastomer, e.g., polychloroprene. The resin and elastomer are thoroughly blended above the melting point of the resin, cooled below the melting point of the resin and curatives added. The composition is then shaped and free cured without pressure restraint.

U.S. Pat. No. 3,965,055 discloses blends of vulcanizable rubbers with a resin,e.g., polypropylene. The vulcanizable rubbers can include polychloroprene and butyl rubber blends. The resin is dispersed throughout the continuous rubber phase and has a particle size of cross section of about 0.5 microns or less and an L/D ratio of at least 2. The compositions can be blended with curatives, formed and vulcanized by free curing without pressure restraint.

U.S. Pat. No. 4,005,054 discloses a vulcanizable composition comprising a resin and a rubber wherein the resin can be polypropylene and the rubber can be polychloroprene. The composition is processed so that the resin is formed into fibrils of less than 5 microns in diameter. The product is said to resist elongation in one direction.

SUMMARY OF THE INVENTION

It has surprisingly been found that a TPO having low hardness, and excellent resilience as well as good physical strength characteristics coupled with excellent processibility, excellent flow characteristics, good oil resistance and low compression set can be prepared from a blend of a specific type of thermoplastic olefin resin and two rubber components. The unexpected result is achieved by selecting as the thermoplastic olefin an ethylene copolymer resin, e.g., ethylene vinyl acetate, ethylene methyl acrylate, etc., and as rubbers halogenated butyl rubber and polychloroprene. The rubbers are blended with the resin and dynamically cured, preferably using a ZnO containing cure system.

The compositions exhibit exceptional resilience and low tension set as well as unusually low hardness, properties quite unusual for dynamically vulcanized compositions. They are useful in various molded and extruded articles, including seals, gaskets, clamped hose, etc.

DETAILED DESCRIPTION

This invention relates to improved TPO compositions. In particular it relates to compositions of a specific type of polyolefin resin and two rubbers, one of which is a halogenated butyl rubber and the other rubber is a polychloroprene. The vulcanization or curing (i.e., crosslinking) of the rubber is accomplished by dynamic vulcanization.

As used in the specification and claims, the term "dynamic vulcanization" means a vulcanization process for effecting crosslinking of a rubber-containing TPO composition wherein the rubber is vulcanized under conditions of high shear. As a result, the rubber is simultaneously crosslinked and dispersed as fine particles of a "micro-gel" within a polyolefin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber and/or thermoplastic processing techniques such as extrusion, injection molding, compression molding, etc. Scrap or flashing can be salvaged and reprocessed.

The term "dynamically vulcanized alloy" (DVA) as used in the specification and claims means a composition comprising a thermoplastic resin and a rubber wherein the rubber component has been dynamically vulcanized to a fully cured state. The compositions are generally prepared by blending together the polyolefin resin and rubbers with curatives and fillers under conditions of dynamic vulcanization.

In preparing the preferred DVA compositions of this invention at least one ethylene copolymer polyolefin resin is blended with a halogenated butyl rubber and a polychloroprene rubber.

The term "ethylene copolymer resin" as used in the specification and claims means copolymers of ethylene with an alkyl ester of an alpha, beta monoethylenically unsaturated monocarboxylic acid as well as copolymers with the acid per se. In particular, copolymers of ethylene with vinylacetate or alkyl acrylates, for example methyl acrylate, (EMA), butyl acrylate (EBA), and ethyl acrylate (EEA) can be employed. These ethylene copolymers typically comprise about 70 to about 98 wt% ethylene, preferably about 70 to 95 wt% ethylene, more preferably about 71 to about 91 wt% ethylene, e.g., about 72 to about 85 wt% ethylene the balance of copolymer being the alkyl ester. The expression "EVA" means, specifically ethylene-vinylacetate copolymers. The ethylene-copolymer resins suitable for use in the practice of this invention have a melt index of about 0.2 to about 500 (ASTM D 1238 Condition E).

Other polyolefin resins such as high density polyethylene, polypropylene and reactor copolymers of polypropylene can optionally be blended in limited amounts with the ethylene copolymer resin to the extent that such other polyolefin resins do not detract from the desirable high resilience and low hardness of the preferred compositions. The use of such other polyolefin resins can increase the high temperature resistance of the resulting blends. Similarly, limited amounts of other polyolefin homopolymers and copolymers can be optionally utilized in combination with ethylene copolymer resin in the practice of this invention if desired, e.g., low density polyethylene, linear low density polyethylene and polybutylene.

The rubbers which can be used in the practice of this invention are halogenated butyl rubber and polychloroprene. Halogenated buty rubber is typically prepared from butyl rubber.

Butyl rubber is a copolymer of an isoolefin and a conjugated multiolefin. The useful copolymers comprise a major portion of isoolefin and a minor amount, preferably not more than 30 wt%, of a conjugated multiolefin. The preferred copolymers comprise about 85-99.5 wt% (preferably 95-99.5 wt%) of a $C_4$-$C_7$ isoolefin, such as isobutylene, and about 15-0.5 wt% (preferably about 5-0.5 wt%) of a multiolefin of about 4-14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608-609, etc. The term "butyl rubber" as used in the specification and claims includes the aforementioned copolymers of an isoolefin having 4-7 carbon atoms and about 0.5 to 20 wt% of a conjugated multiolefin of about 4-10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and precipitates out of solution as fine particles. The polymerization is generally carried out at temperatures of about $-90°$ C. to $-100°$ C. See U.S. Pat. Nos. 2,356,128 and 2,356,129 incorporated herein by reference.

The polymerization process, which is typically carried out in a draft tube reactor, is continuous. Monomer feed and catalyst are continuously introduced at the bottom of the draft tube where an axial flow pump is located. The pump circulates the slurry at high velocity to provide efficient mixing and heat transfer. Polymer slurry containing about 20-30 wt% butyl rubber continuously overflows from the reactor through a transfer line.

Where the desired product is the butyl rubber itself, the slurry is fed through the transfer line to a flash drum operated at about 140-180Pa (1.38-1.58 atm) and 65°-75° C. Steam and hot water are mixed with the slurry in a nozzle as it enters the drum to vaporize methyl chloride and unreacted monomers which pass overhead are recovered, and the polymer is finished by water removal and drying. Where, however, it is desired to produce a halogenated butyl rubber, this can be accomplished by preparing a solution of the rubber. Of course, any halogenation technique may be utilized.

In one preferred method of halogenation a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The ethylene copolymer resin component of the DVA composition of this invention comprises about 25 to about 100 wt% of ethylene copolymer resin; preferably about 35 to about 100 wt%; more preferably about 45 to about 100 wt%, e.g., 45 to about 90 wt%. Blends of EVA with EMA and or EEA may also be used. The optional aforedescribed polyolefin resins and other polyolefin homopolymers and copolymers which can be blended with the ethylene copolymer resin comprise about 0 to 75 wt% of the ethylene copolymer resin component of the DVA. When the optional resin is used, it is preferably incorporated into the blend at about 10 to about 55 wt%; more preferably about 15 to about 35 wt% of the ethylene copolymer resin component is the optional resin. In the preferred embodiment of this invention, ethylene vinyl acetate is used alone as the ethylene copolymer resin.

In the practice of this invention, the ethylene copolymer resin, the halogenated butyl rubber and the polychloroprene are preferably utilized in substantially equal proportions. The term "substantially equal proportions" as used in the specification and claims with respect to the ethylene copolymer resin and rubbers means that each of the rubbers are incorporated in the DVA at about 90 to 110 wt% based on the ethylene copolymer resin (e.g., EVA) fraction of the polymer blend. For example, where the EVA is present in the DVA at about 20 wt% based on the overall DVA composition, the halogenated butyl rubber and the polychloroprene can each be present at about 18 to about 22 wt%. The term "polymer blend" as used in the specification and claims means the blend of ethylene copolymer resin and rubbers.

The polychloroprene rubber is the primary contributor to oil resistance and enhances resilience of the DVA composition of this invention. It should comprise at least 35 wt% of the halogenated butyl rubber plus polychloroprene rubber. On the other hand, polychloroprene is not ordinarily compatible with ethylene copolymer resins while halogenated butyl rubber is. The halogenated butyl rubber serves to "compatibilize" the polychloroprene with the ethylene copolymer resin and should be present at a level of at least 25 wt% based on the total rubber. Hence, the halogenated butyl rubber can comprise about 25 to about 65 wt% of the total rubber in the DVA composition. Preferably, each of the rubbers comprise about 35 to about 65 wt% of the total rubber. It will be evident from this disclosure that a novel aspect of this invention is that a rubber which is not normally compatible with a resin polymer can be made so by blending it with a minor amount of a second rubber which is compatible with the resin.

The polymer blend comprises about 40 to about 80 wt% of the overall DVA composition. Each component of the polymer blend can comprise about 12 to about 35 wt% of the DVA. Preferably each of the rubbers and the ethylene copolymer resin comprise about 13 to about 32 wt% of the DVA composition, more preferably about 15 to about 30 wt% of the DVA, most preferably about 16 to about 28 wt%, e.g., about 18 to about 22 wt%.

In addition to the polymer component, the DVA composition of this invention can include fillers, antioxidants, stabilizers, rubber processing oils, lubricants (e.g., oleamide), antiblocking agents, waxes, foaming agents, pigments, coupling agents for the fillers and other processing aids known to the rubber and plastics compounding art. Metal oxides, e.g., MgO, can be included to act as acid acceptors. The pigments and fillers can comprise up to 30 wt% of the total DVA composition based on polymer component plus additives. Preferably the filler comprises about 5 to about 30 wt% based on the DVA composition, more preferably about 7 to about 28 wt%, e.g., about 8 to about 25 wt% of the overall composition.

Fillers can be inorganic fillers such as calcium carbonate, clays, silica or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the DVA which is to be dynamically vulcanized. This ratio can vary from 0.1/1 to about 1.3/1; preferably about 0.2/1 to about 1/1; more preferably about 0.3/1 to about 0.75/1. Oils other than petroleum based oils such as oils derived from coal tar and pine tar can also be utilized.

In addition to the petroleum derived rubber process oils, organic esters and other synthetic plasticizers can be used. As used in the specification and claims, the term "process oil" means both the petroleum derived process oils and synthetic plasticizers.

The process oil is a desirable ingredient of the DVA where it is necessary to insure that the DVA has good flow properties, e.g., spiral test flow reading greater than about 8 cm., preferably greater than about 15 cm., particularly where the composition is to be used for injection molding. The quantity of oil utilized will depend in part on the amount of polymer blend, the type of ethylene copolymer resin and filler used as well as, to some extent, the type of cure system utilized. Generally, the process oil will comprise about 10 to about 35 wt%, e.g., about 13 to about 30 wt% of the DVA. Larger amounts of process oil can be used, the deficit being reduced physical strength of the DVA.

Where the ethylene copolymer resin comprises a blend of one or more optional resins in addition to, e.g., the EVA, the process oil content of the DVA can be increased or reduced proportionately depending on the contribution of the flow characteristics of the optional resin as well as the strength and other properties desired.

Antioxidants can be utilized in the composition of this invention — the particular antioxidant utilized will depend on the rubbers and plastics utilized and more than one type may be required. Their proper selection is well within the skill of the practitioner in this field. Antioxidants will generally fall into the class of chemical or physical protectants. Physical protectants are used where there is to be little movement in the part to be manufactured from the composition. These are generally waxy materials which impart a "bloom" to the surface of the rubber part and form a protective coating or shield the part from oxygen, ozone, etc. The physical protectants include mixed petroleum waxes and microcrystalline waxes.

The chemical protectants generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Nonlimiting examples of these and other types of antioxidants are styrenated phenol; 2,2'-methylene-bis-(4-methyl-6-1, butylphenol); 2,6'-di-t-butyl-o-dimethyl-amino-p-cresol; hydroquinone monobenzyl ether, octylated diphenyl amine, phenylbeta-naphthlyamine; N,N'-di-phenylethylene diamine; aldolalpha-naphthyla-mine; N,N'-di-phenyl-p-phenylene diamine, etc.

Any conventional cure system for the rubber to be dynamically vulcanized can be used except that peroxide cures should be used with caution since they can crosslink the ethylene copolymer resin and thereby reduce thermoplasticity and they can depolymerize polypropylene where the latter is included as an optional ingredient. Otherwise, any of the curatives or cure systems known in the art for the vulcanization or curing (i.e., crosslinking) of conjugated diene rubbers are suitable. These include sulfur cures as well as non-sulfur cures. For example, halogenated butyl rubber can be cured using zinc oxide alone. Of course, accelerators such as dithiocarbamates, thiurams, diamines and thioureas can be included in these zinc oxide cures. Zinc oxide free cures of halogenated butyl rubber known to the art can be utilized. For example, one such vulcanizing system comprises litharge, 2-mercaptoimidazoline and diphenyl guanidine.

Resin cures can be used for halogenated butyl rubber and polychloroprene rubber. The resins useful as curatives are phenolic resins, brominated phenolic resins, urethane resins, etc.

While phenolic resin cures are suitable cures, they impart a yellowish or orangish tinge to the rubber part. A preferred cure is one based on ZnO and/or MgO. Such cures permit the use of pigments such as $TiO_2$ to give bright white compositions. In the cure system, the MgO acts primarily not as an accelerator, but as an acid acceptor to stabilize the rubber from dehalogenation.

In a preferred embodiment, the halogenated rubber to be vulcanized is chlorinated or brominated butyl rubber. Halogenated butyl rubbers are vulcanized with zinc oxide cures. Sulfur-bearing accelerators can be utilized with the zinc oxide.

Illustrative of accelerators which can be used in conjunction with ZnO for curing halogenated butyl rubber are brominated alkyl phenol resin; N,N'-diethylthiourea; di-ortho-(tolyl)guanidine salt of dicatechol borate; dipentamethylene thiuram tetrasulfide ethylene trithiocarbamate; 2-mercapto-benzothiazole; benzothiazole disulfide; tetra methyl thiuram disulfide, zinc diethyldithiocarbamate, zinc dibutyldithiocarbamate, and zinc dimethyldithiocarbamate. Formulations for the ZnO cure of halogenated butyl rubber and polychloroprene are well known in the art. A preferred cure system comprises MgO, ZnO and zinc diethyldithiocarbamate since this system results in a vulcanized rubber with low compression set.

In the practice of this invention the ethylene copolymer resin and rubbers are mixed together at a temperature sufficient to soften the resin or, more commonly, at a temperature above its melting point where the resin is crystalline at room temperature. After the resin and rubbers are intimately mixed, the curative is added. Heating and masticating at vulcanization or curing temperatures are generally adequate to complete vulcanization in about 0.5 to about 10 minutes. The vulcanization time can be reduced by elevating the temperature of vulcanization. A suitable range of vulcanization temperatures is from about the melting point of the ethylene copolymer resin (about 90° C. depending on the comonomer content) to about 225° C.; more typically, the temperature range is about 120° C. to about 200° C. Preferably the vulcanization is carried out at a temperature of about 150° C. to about 190° C.

It is preferred that the mixing process be continued until vulcanization is complete. If vulcanization is permitted to continue after mixing has stopped, the composition will not be reprocessible as a thermoplastic. However, the dynamic vulcanization can be carried out in stages. For example, vulcanization can be commenced in a twin screw extruder and pellets formed of the DVA material using an underwater pelletizer thereby quenching the vulcanization before it is complete. It can be completed at a later time under dynamic vulcanization conditions. Those skilled in the art will appreciate the appropriate quantities, types of curatives and extent of mixing time required to carry out the vulcanization of the rubber. Where necessary, the rubber alone can be vulcanized using varying amounts of curative to determine the optimum cure system to be utilized and the appropriate cure conditions to achieve a full cure.

While it is preferred that all components are present in the mix prior to carrying out the dynamic vulcanization process of this invention, this is not a necessary condition. For example, in one embodiment the rubber to be cured can be dynamically vulcanized in the presence of some or all of the ethylene copolymer resin. This blend can then be let down into additional ethylene copolymer and/or optional resin. Similarly, it is not necessary to add all of the fillers and oil prior to dynamic vulcanization. Some or all of the fillers and oil can be added after dynamic vulcanization is complete.

The term "fully vulcanized" as used in the specifications and claims with respect to the dynamically vulcanized rubber component of this invention means that the rubber component to be vulcanized has been cured to a state in which the physical properties of the rubber are developed to impart elastomeric properties to the rubber generally associated with the rubber in its conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component of the blends to the extent that it contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that rubber component of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferredly $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and that a large proportion of the resin can be removed from the composition by high temperature solvent extraction.

The cross-link density of the rubber is determined by equilibrium solvent swelling using the Flory-Rehner equation. *J. Rubber Chem. and Tech*, 30, p. 929. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term v is multiplied by the gel fraction (%gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred composition of this invention comprises ethylene vinyl acetate as the ethylene copolymer resin, in combination with chlorinated butyl rubber and polychloroprene, and the rubbers are dynamically vulcanized utilizing a ZnO cure system (which can include a curing resin or an accelerator).

The compositions exhibit exceptional resilience and low tension set as well as unusually low hardness, properties quite unusual for dynamically vulcanized compositions. They are useful in various molded and extruded articles, including seals, gaskets, clamped hose, etc.

The advantage of this invention may be more readily appreciated by reference to the following examples. Typical mixing conditions used to prepare the DVA compositions are shown in Table I.

TABLE I

Typical Mixing Procedure - Internal Mixer (e.g., "B" Banbury)

| | |
|---|---|
| Step 1 | Load elastomer(s), EVA, stabilizers, mineral filler and process aids. Mix at high speed until fluxed (approximately 140–150° C. chart temperature). |
| Step 2 | Bring temperature to approximately 150° C. (chart) and add approximately two-thirds of oil in small increments being certain to maintain batch temperature above the melting point of the EVA. |
| Step 3 | Add the curatives. Observe peak in mixing torque (typically 60–120 seconds later). Mix an additional 4–5 minutes past peak. |
| Step 4 | Add remaining oil. |
| Step 5 | Dump mix when oil has been absorbed. Sheet out batch on cool mill. |

EXAMPLES 1-8

A series of DVA compounds were made using ethylene copolymer resins, chlorinated butyl rubber and Neoprene ® W (Table II). The compounds differed in polymer blend content, ethylene copolymer resin type, oil content, and cure system. The compositions were dynamically cured with the indicated cure systems using the procedure set forth in Table I.

For comparative purposes, composition 8 utilizes an ethylene propylene copolymer which is outside of the scope of the defined ethylene copolymer and resulted in a composition which had very low hardness and was resilient, but which was severely deficient in strength as indicated by tensile strength and high compression set. Composition 7 contained stearic acid in place of process oil which resulted in a harder blend with less ability to flow. The concentration of stearic acid exceeded the ability of the polymer blend to absorb it, exuded to the surface and as such does not represent a desirable blend.

The data show that blends within the scope of the invention resulted in very resilient, soft compositions which also exhibited excellent compression set resistance. Compositions 2-5 were particularly attractive considering the combination of physical properties and processability.

TABLE II

| Ingredient[a] | 1 | 2 | 3 | 4 | 5 | 6 | 7 | 8 |
|---|---|---|---|---|---|---|---|---|
| Chlorobutyl 1066 | 18.5 | 18.5 | 18.5 | 18.5 | 20.3 | 28.5 | 28.5 | 20.3 |
| EVA Exxon XR-70.36 | 18.5 | — | — | — | — | — | — | — |
| EVA Exxon LD-721 | — | 18.5 | — | 18.5 | 20.3 | 19.4 | 19.4 | — |
| EMA Gulf 2255 | — | — | 18.5 | — | — | — | — | — |
| JSR EP-02P | — | — | — | — | — | — | — | 20.3 |
| Neoprene W | 18.5 | 18.5 | 18.5 | 18.5 | 20.3 | 28.5 | 28.5 | 20.3 |
| Maglite D | 1.8 | 1.8 | 1.8 | 0.45 | 3.6 | 2.7 | 2.7 | 3.6 |
| Atomite | 8.4 | 8.4 | 8.4 | 8.4 | 12.5 | — | — | 12.5 |
| Circosol 4240 Oil | 29 | 29 | 29 | — | — | — | — | — |
| Flexon 766 Oil | — | — | — | 29 | 15.5 | 12.9 | — | 15.5 |
| Irganox 1010 | 0.09 | 0.09 | 0.09 | 0.09 | 0.09 | 0.09 | 0.09 | 0.09 |
| DLTDP | 0.18 | 0.18 | 0.18 | 0.18 | 0.18 | 0.18 | 0.18 | 0.18 |
| Stearic Acid | 0.45 | 0.45 | 0.45 | 0.45 | 0.45 | 0.45 | 13.6 | 0.45 |
| Zinc Oxide | 3.6 | 3.6 | 3.6 | 3.6 | 4.5 | 5.9 | 5.9 | 4.5 |
| Permalux | 0.9 | 0.9 | 0.9 | — | — | 1.4 | 1.4 | — |
| SP-1055 Resin | — | — | — | 2.3 | 2.3 | — | — | 2.3 |
| Color Description | Light Brown | | | Yellow-gold | | Brown | Brown | Yellow |
| | Soft, Very Rubbery, Snappy | | | | | | | |
| Processability: | | | | | | | | |
| Bands on Rubber Mill | Yes | Yes | Yes | Yes | Yes | Yes | Yes | Yes |
| Spiral Flow Test - cm at 800 psi | 4[b] | 27 | 23 | 34 | 15 | 8 | 9 | 8 |
| Physical Properties, Injection Molded | | | | | | | | |
| Hardness, Shore A, Instantaneous | 45 | 50 | 49 | 46 | 60 | 62 | 77 | 30 |
| Tensile Strength, psi | 595 | 520 | 420 | 420 | 695 | 755 | 740 | 145 |
| Elongation, % | 180 | 170 | 130 | 220 | 140 | 100 | 120 | 210 |
| Set at Break, % | 0 | 10 | 0 | 20 | 10 | 0 | 20 | 10 |
| Compression Set B, % | | | | | | | | |

TABLE II-continued

| Ingredient[a] | Example | | | | | | | |
|---|---|---|---|---|---|---|---|---|
| | 1 | 2 | 3 | 4 | 5 | 6 | 7 | 8 |
| 22 Hrs. at RT | 17 | 13 | 13 | 19 | 19 | 14 | 37 | 36 |
| 22 Hrs. at 50° C.[1] | 54 | 40 | 38 | 34 | 40 | 23 | — | — |

[a]See Ingredient List, Table III
[b]High shrinkage in direction of flow; true value higher than indicated
[1]Plied specimens after annealing 1 hr @ 70° C. to remove molding stress

TABLE III

| Ingredient List | | |
|---|---|---|
| CHLOROBUTYL 1066 | Chlorinated isoprene-isobutylene copolymer, 51-60 ML (1 + 8) 100° C. | Exxon Chemical Americas |
| Exxon (EVA) XR-70.36 | Ethylene vinyl acetate copolymer, 3 MI, 28% vinyl acetate | Exxon Chemical Americas |
| Exxon (EVA) LD-721 | Ethylene vinyl acetate copolymer, 2.5 MI, 18% vinyl acetate | Exxon Chemical Americas |
| Gulf (EMA) 2255 | Ethylene methyl acrylate copolymer, 2.4 MI, 20% methyl acrylate | Gulf Oil Chemicals, U.S. Plastics Division |
| JSR EP-02P | Ethylene propylene copolymer, 20 Mooney at 100° C., 73% ethylene | Japan Synthetic Rubber Company |
| Flexon 766 | Naphthenic process oil ASTM Type 104A | Exxon Company USA |
| Atomite | Natural ground calcium carbonate, mean particle size 3 microns | Thompson, Weinman and Company |
| Maglite D | Magnesium oxide | C. P. Hall, Merck Chemical Company |
| DLTDP | Dilauryl thiodipropionate | W. R. Grace and Company |
| Neoprene W | Polychloroprene Rubber 42-52 ML (1 + 4) 100° C. | DuPont Elastomers Division |
| Circosol 4240 Oil | Naphthenic Process Oil ASTM Type 103 | Sun Petroleum Marketing Company |
| SP 1055 | Brominated alkyl phenol resin | Schenectady Chemical |
| Permalux | Di-ortho quanidine salt of dicathechol borate | DuPont Elastomers Chemical Department |

What is claimed is:

1. A soft, resilient thermoplastic composition comprising a polymer blend wherein the polymer blend comprises ethylene copolymer resin, a halogenated butyl rubber and a polychloroprene rubber, said rubbers being crosslinked by dynamic vulcanization in the presence of the ethylene copolymer resin.

2. The composition according to claim 1 wherein said ethylene copolymer resin is selected from the group consisting of copolymers of ethylene with an alpha, beta monoethylenically unsaturated monocarboxylic acid, copolymers of ethylene with an alkyl ester of said acid and mixtures thereof.

3. The composition according to claim 1 wherein said ethylene copolymer is selected from the group consisting of ethylene vinyl acetate, ethylene methyl acrylate, ethylene butyl acrylate and ethylene ethyl acrylate.

4. The composition according to claim 1 having a process oil incorporated in the composition.

5. The composition according to claim 4 wherein the oil is incorporated into the composition at a weight ratio of oil to rubber of about 0.1/1 to about 1.3/1.

6. The composition according to claim 1 wherein a process oil is incorporated into the composition at about 10 wt% to about 35 wt% based on the overall composition.

7. The composition according to claim 1 wherein said ethylene copolymer resin, halogenated butyl rubber and polychloroprene are each incorporated into the composition in substantially equal proportions.

8. The composition according to claim 1 wherein said ethylene copolymer resin comprises a blend of ethylene copolymer resin with a limited amount of at least one optional polyolefin resin.

9. The composition according to claim 8 wherein the optional polyolefin is selected from the group consisting of high density polyethylene, polypropylene, reactor copolymers of polypropylene, linear low density polyethylene, low density polyethylene, and polybutylene.

10. The composition according to claim 1 wherein a filler is incorporated into the composition.

11. The composition according to claim 10 wherein the filler is incorporated into the composition at about 5 to 30 wt% based on the total composition.

12. The composition according to claim 1 wherein the polymer blend comprises about 40 to about 80 wt% of the overall composition and the remainder of the composition comprises process oil, fillers and curatives.

13. The composition according to claim 12 wherein the ethylene copolymer resin comprises about 12 to about 35 wt% of the overall composition.

14. The composition according to claim 12 wherein said ethylene copolymer resin, halogenated butyl rubber and polychloroprene are each incorporated into the composition at substantially equal proportions.

15. The composition according to claim 1 wherein said halogenated butyl rubber is chlorinated butyl rubber, brominated butyl rubber or blends thereof.

16. The composition according to claim 1 wherein said halogenated butyl rubber comprises at least 25 wt% based on halogenated butyl rubber plus polychloroprene.

17. The composition according to claim 1 wherein said polychloroprene comprises at least 35 wt% based on halogenated butyl rubber and polychloroprene.

18. The composition according to claim 1 wherein said halogenated butyl rubber comprises about 25 to about 65 wt% based on halogenated butyl rubber plus polychloroprene.

19. A method for preparing compatible blends of ethylene copolymer resin and a polychloroprene rubber wherein said polychloroprene rubber is incompatible with said ethylene copolymer resin which comprises blending with said ethylene copolymer resin and polychloroprene rubber a halogenated butyl rubber wherein said halogenated butyl rubber is compatible with said resin said rubbers being co-vulcanized by dynamic vulcanization in the presence of said ethylene copolymer resin.

20. The method according to claim 19 wherein said halogenated butyl rubber comprises at least 25 wt% of the total of said polychloroprene rubber plus halogenated butyl rubber.

21. The method according to claim 19 wherein said ethylene copolymer resin is ethylene vinyl acetate, ethylene methyl acrylate, ethylene butyl acrylate, ethylene ethyl acrylate or blends thereof.

22. The method according to claim 19 wherein said halogenated butyl rubber is chlorinated butyl rubber.

* * * * *